US009353779B2

(12) United States Patent
Hendrix et al.

(10) Patent No.: US 9,353,779 B2
(45) Date of Patent: May 31, 2016

(54) MOLDED ENCAPSULATED RETAINER

(75) Inventors: Brian Pierre Hendrix, Detroit, MI (US); Giriraj Srinivasan, Troy, MI (US); Brian F. Vander Haagen, Dexter, MI (US); David Thomas McNarney, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 263 days.

(21) Appl. No.: 13/297,799

(22) Filed: Nov. 16, 2011

(65) Prior Publication Data
US 2013/0121789 A1   May 16, 2013

(51) Int. Cl.
| | |
|---|---|
| F16B 37/00 | (2006.01) |
| F16B 21/00 | (2006.01) |
| F16B 5/02 | (2006.01) |
| F16B 37/04 | (2006.01) |
| F16B 5/06 | (2006.01) |
| F16B 21/08 | (2006.01) |
| F16B 37/08 | (2006.01) |
| F16B 43/00 | (2006.01) |

(52) U.S. Cl.
CPC .............. *F16B 5/025* (2013.01); *F16B 5/0628* (2013.01); *F16B 37/044* (2013.01); *F16B 21/084* (2013.01); *F16B 37/0842* (2013.01); *F16B 43/00* (2013.01)

(58) Field of Classification Search
CPC ...... F16B 5/025; F16B 5/0628; F16B 21/084; F16B 37/0842; F16B 43/00; F16B 37/00; F16B 37/044; F16B 37/02; F16B 33/006; Y10S 411/907; Y10S 411/908; Y10S 411/918

USPC ......... 411/511, 904, 908, 103, 108, 432, 516, 411/523, 512, 111–113
See application file for complete search history.

(56) References Cited

U.S. PATENT DOCUMENTS

| | | | | |
|---|---|---|---|---|
| 1,761,358 | A | * | 6/1930 | Mitchel .......................... 411/113 |
| 2,390,752 | A | * | 12/1945 | Tinnerman .................... 411/112 |
| 3,640,327 | A | * | 2/1972 | Burt .............................. 411/108 |
| 3,646,982 | A | | 3/1972 | Cushman |
| 4,488,844 | A | * | 12/1984 | Baubles ........................ 411/85 |
| 4,728,236 | A | | 3/1988 | Kraus |
| 4,955,772 | A | * | 9/1990 | Reck ............................. 411/175 |
| 4,990,044 | A | * | 2/1991 | Kimak ........................... 411/427 |
| 5,028,189 | A | * | 7/1991 | Harley ........................... 411/108 |
| 5,096,350 | A | * | 3/1992 | Peterson ........................ 411/12 |
| 5,332,347 | A | | 7/1994 | Kimisawa |
| 5,423,646 | A | * | 6/1995 | Gagnon ......................... 411/184 |
| 5,553,984 | A | * | 9/1996 | Smith ............................ 411/429 |
| 5,713,707 | A | * | 2/1998 | Gagnon ......................... 411/175 |
| 5,897,281 | A | * | 4/1999 | Haga et al. ..................... 411/525 |
| 7,192,231 | B2 | * | 3/2007 | Blackaby ....................... 411/111 |
| 7,207,762 | B2 | * | 4/2007 | Teal .............................. 411/526 |
| 7,255,521 | B2 | * | 8/2007 | Yake et al. .................... 411/111 |
| 2002/0182027 | A1 | * | 12/2002 | Gauron ......................... 411/112 |

(Continued)

Primary Examiner — Flemming Saether
(74) Attorney, Agent, or Firm — Damian Porcari; Price Heneveld LLP

(57) ABSTRACT

An encapsulated retainer comprises a barrel that defines a fastener-securing void. The barrel has a flange that extends about its periphery. The encapsulated retainer further comprises an outer shell that has a top wall with a fastener-receiving aperture and a bottom wall that has a barrel-receiving aperture. The barrel extends into the barrel-receiving aperture. The encapsulated retainer further comprises first and second side walls which connect the top wall with the bottom wall. A connecter connects the outer shell with the flange.

15 Claims, 9 Drawing Sheets

(56) References Cited

U.S. PATENT DOCUMENTS

| | | | |
|---|---|---|---|
| 2005/0008456 A1* | 1/2005 | Birkelbach et al. | 411/526 |
| 2008/0310931 A1* | 12/2008 | Csik et al. | 411/103 |
| 2009/0129885 A1* | 5/2009 | Csik et al. | 411/103 |
| 2010/0310338 A1* | 12/2010 | Diez Herrera | 411/432 |

* cited by examiner

MOLDED ENCAPSULATED RETAINER

FIELD OF THE INVENTION

The present invention generally relates to a fastener to connect components together, and more specifically to a molded plastic encapsulated retainer.

BACKGROUND OF THE INVENTION

Various fasteners are used in the automotive industry for connecting vehicle parts or components together. Examples of these fasteners include bolts, screws, retainers, and clips. Other fasteners include push-in or snap-in clips made from a plastic material, which are insertable into a hole or an aperture in a component.

SUMMARY OF THE INVENTION

According to one aspect of the present invention, an encapsulated retainer comprises a barrel that defines a fastener-securing void. The barrel has a flange that extends about its periphery. The encapsulated retainer further comprises an outer shell that has a top wall with a fastener-receiving aperture and a bottom wall that has a barrel-receiving aperture. The barrel extends into the barrel-receiving aperture. The encapsulated retainer further comprises first and second side walls which connect the top wall with the bottom wall. A connecter connects the outer shell with the flange.

According to another aspect of the present invention, an encapsulated retainer comprises a plastic outer shell that includes a top wall and a bottom wall attached by opposing side walls. The top wall includes a fastener-receiving aperture. The encapsulated retainer further comprises an inner flange which has an edge integrally connected with one wall of the outer shell. The inner flange having a top aperture that is co-axial with a barrel-receiving aperture in the bottom wall.

According to yet another aspect of the present invention, a method of making an encapsulated retainer comprises providing a single-shot mold cavity and forming a plastic outer shell including a top wall and a bottom wall attached by opposing side walls. The method further comprises forming a receiving aperture in the top wall, forming a cylindrical receiving barrel with a fastener-receiving void that extends into the barrel-receiving aperture, and forming a flange on a periphery of the cylindrical receiving barrel that connects the cylindrical receiving barrel to the outer shell.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
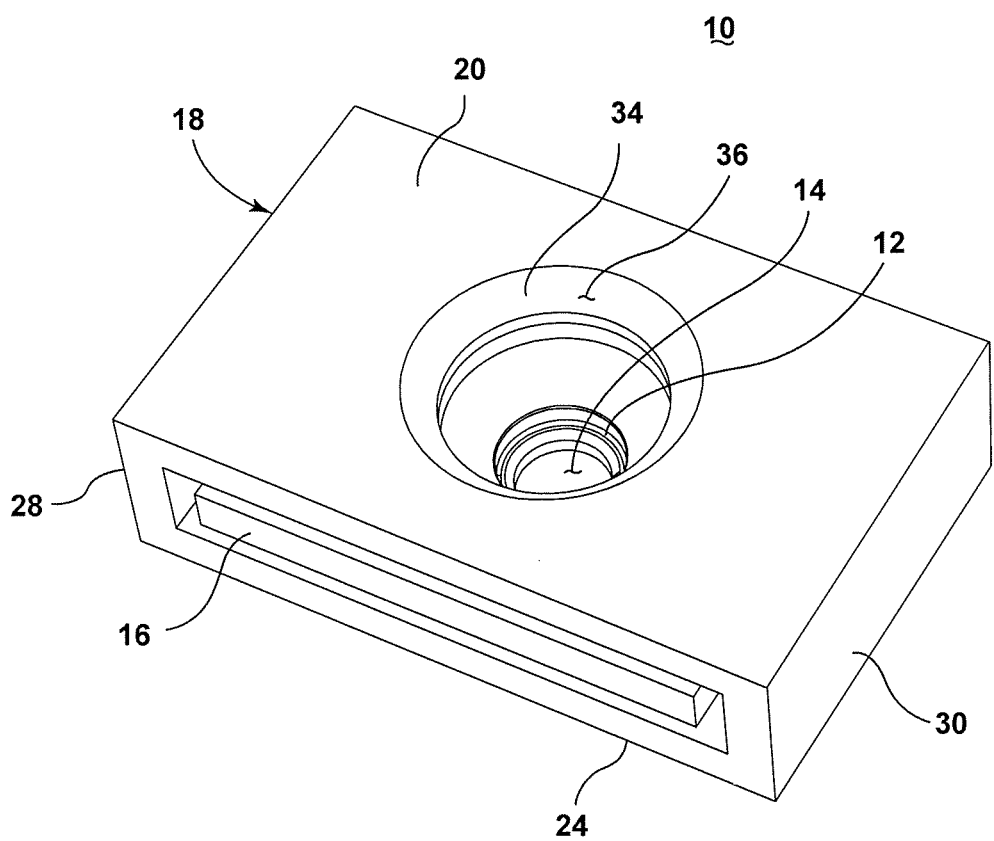
FIG. 1 is a top perspective view of an encapsulated retainer according to the present invention.
Figure 2:
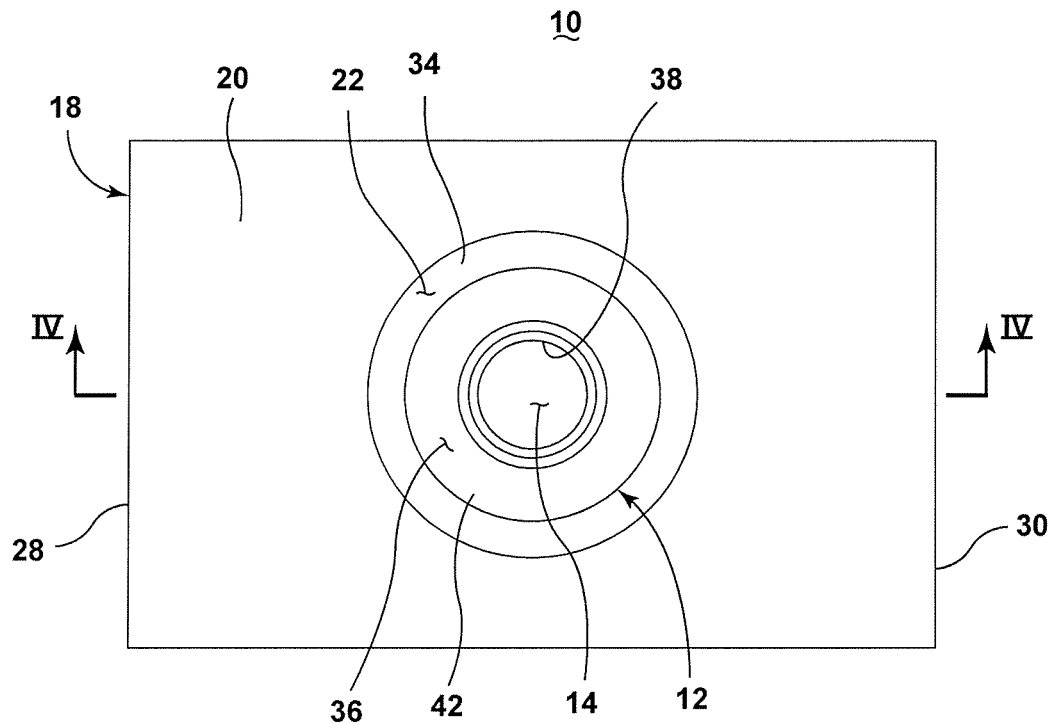
FIG. 2 is a top view of the encapsulated retainer of FIG. 1.

For purposes of description herein, the terms "upper," "lower," "right," "left," "rear," "front," "vertical," "horizontal," "inboard," "outboard," and derivatives thereof shall relate to the fastener as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-5, an encapsulated retainer 10 is illustrated. The encapsulated retainer 10 includes a barrel 12, which defines a fastener-securing void 14. A flange 16 extends about the periphery of the barrel 12. The encapsulated retainer 10 further includes an outer shell 18 that has a top wall 20 with a fastener-receiving aperture, referred to as insertion opening 22, and a bottom wall 24 with a barrel-receiving aperture, referred to as egress opening 26. The barrel 12 extends through, or at least partially into, the egress opening 26. The outer shell 18 comprises a first side wall 28 and a second side wall 30, which connect the top wall 20 with the bottom wall 24. Additionally, a connecter 32 connects the outer shell 18 with the flange 16.

The outer shell 18 is a generally rectangular member formed by the top wall 20, bottom wall 24, and first and second side walls 28, 30, as discussed above. The top wall 20 has a chamfered edge 34 proximate the circular insertion opening 22. In the illustrated embodiment of FIG. 1, the outer shell 18 is depicted as rectangular. However, it is contemplated that the outer shell 18 may be circular.

The barrel 12 is a generally cylindrical member, the flange 16 integral thereto and disposed at the upper end thereof. The barrel 12 includes a top aperture 36 that is co-axial with the fastener-securing void 14 and a chamfered edge proximate the top aperture 36. An interior shoulder 40 is disposed on an inside wall of the barrel 12 and an exterior shoulder 44 is positioned below the flange 16.

Figure 3:
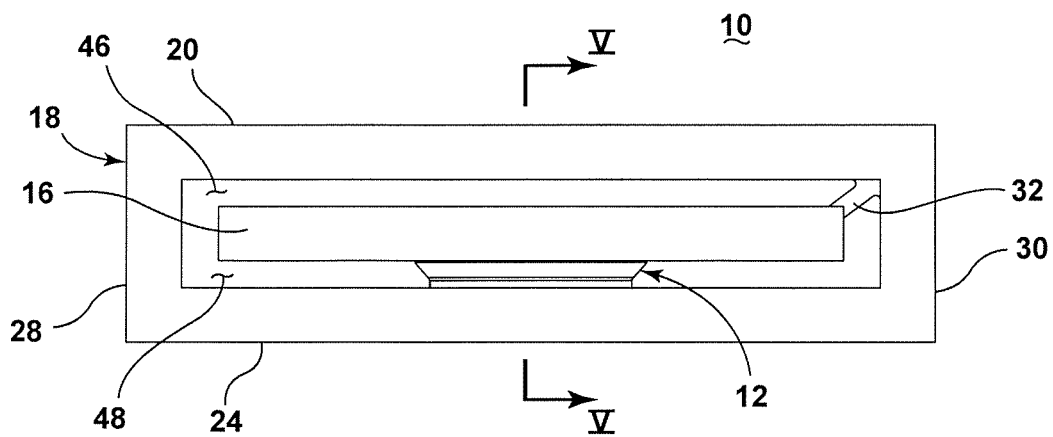
FIG. 3 is a side view of the encapsulated retainer of FIG. 1.
Figure 4:
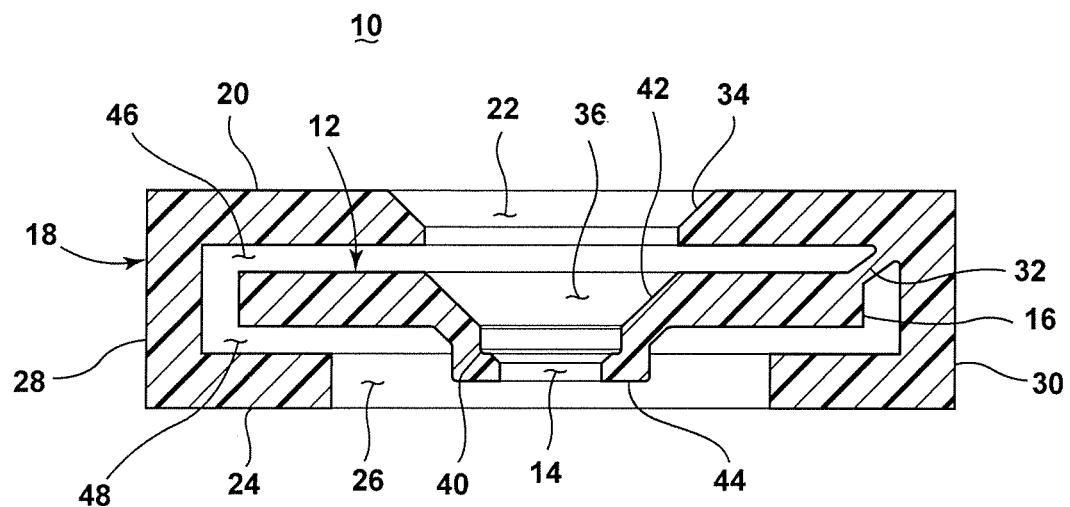
FIG. 4 is a cross-sectional view of the encapsulated retainer taken along line IV-IV of FIG. 2.
Figure 5:
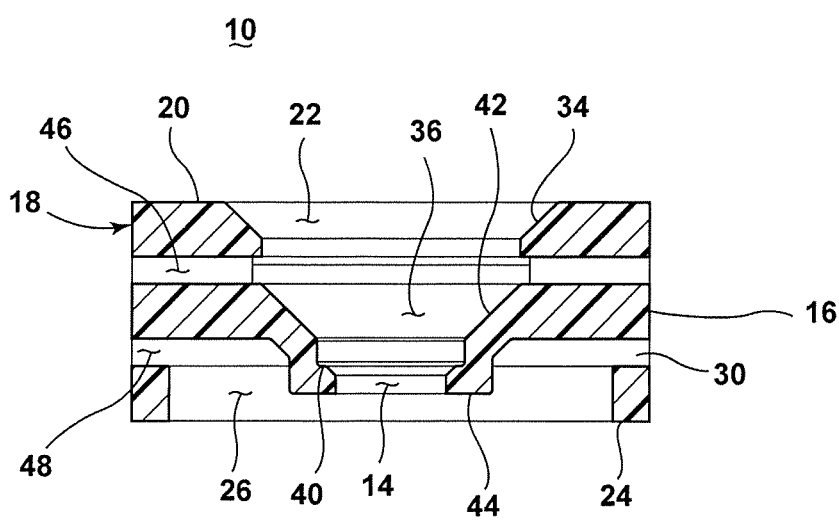
FIG. 5 is a cross-sectional view of the encapsulated retainer taken along line V-V of FIG. 3.

The barrel 12 is disposed within the outer shell 18. More specifically, the flange 16 is positioned between the top and bottom walls 20, 24 and the first and second side walls 28, 30. The barrel 12 extends at least partially into or all the way through the circular egress opening 26 and is oriented within the outer shell 18 such that the top aperture 36 and the insertion opening 22 are approximately co-axial. Further, the flange 16 is spaced between all four walls 20, 24, 28, 30. The gap between the top wall 20 and the flange 16 defines a first space 46, and the gap between the flange 16 and the bottom wall 24 defines a second space 48, as best shown in FIGS. 3-5. Additionally, the flange 16 is generally a rectangular member such that rotation of the barrel 12 within the outer shell 18 is limited. The spatial relationship of the rectangular flange 16 with respect to the first and second side walls 28, 30 prevents the barrel 12 from rotating within the outer shell 18 when installing a fastener therein, as described in greater detail below. While the embodiment illustrated depicts a rectangular flange 16, it is contemplated that the flange 16 could be circular.

Referring to FIGS. 3 and 4, the encapsulated retainer 10 includes the connector 32, which extends between the top wall 20 and the flange 16. It should be understood that the connector 32 could extend between the flange 16 and any one of the walls 20, 24, 28, 30 that form the outer shell 18 The encapsulated retainer 10 is a one-shot injection molded component, and it is the connector 32 that enables molten plastic to flow between the outer shell 18 and the barrel 12 or vice versa. Additionally, it is contemplated that the encapsulated retainer 10 may break during the assembly process, when installing a fastener therein, as described in greater detail below. With the connector 32 broken, the barrel 12 can float freely within the outer shell 18.

Figure 6:
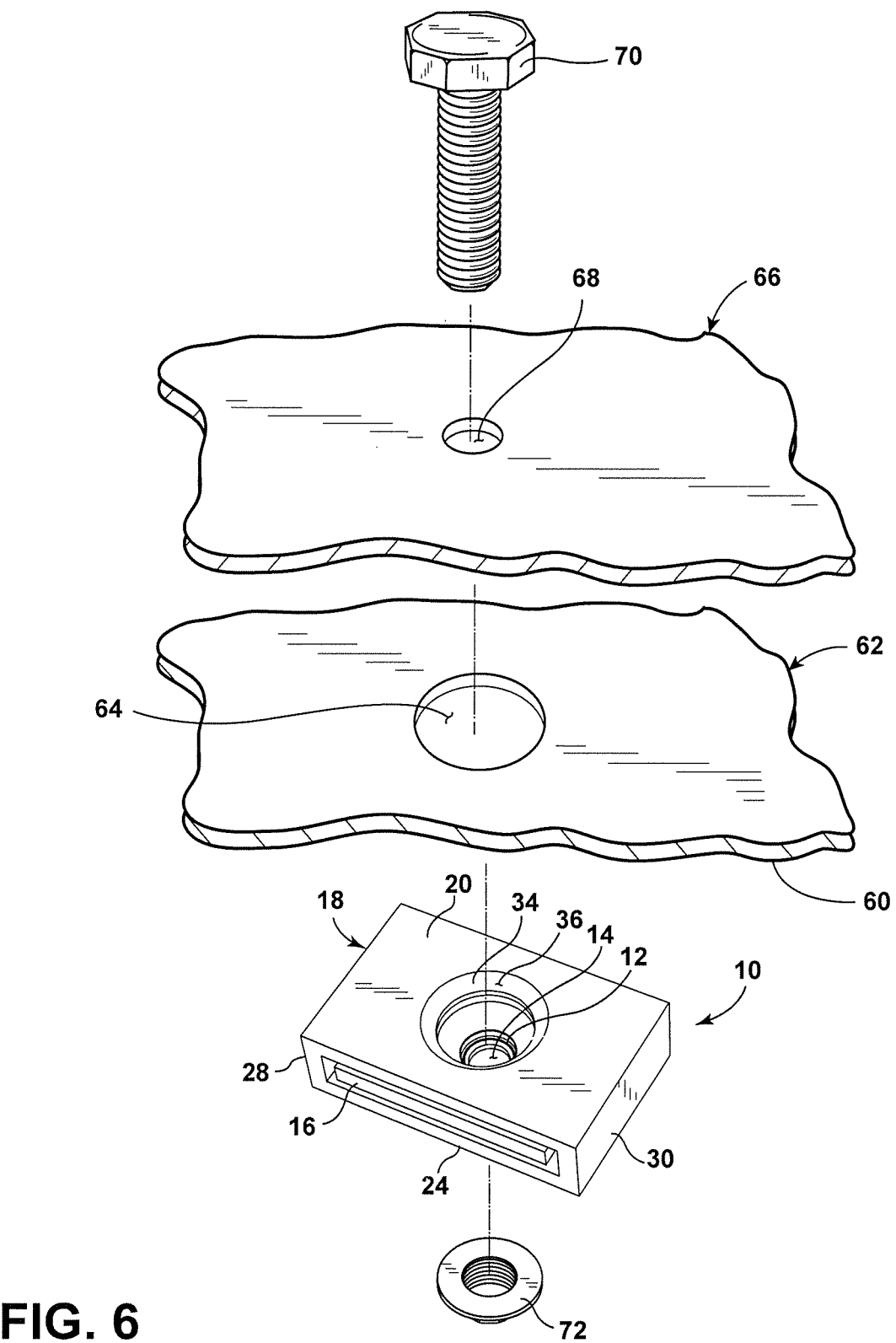
FIG. 6 is a top perspective view of the encapsulated retainer of the present invention, a fastener, and two vehicular components, illustrating the orientation of the components during assembly.

Referring now to FIG. 6, a first embodiment of the encapsulated retainer 10 is illustrated. The encapsulated retainer 10 can be utilized to mechanically connect two adjacent components together. The encapsulated retainer 10 can be mounted to a surface 60 of a substrate or a component 62 using any suitable means of attachment, including ultrasonic welding or gluing. Alternatively, it is contemplated that the encapsulated retainer 10 could be integrally formed with the component 62.

Figure 7:
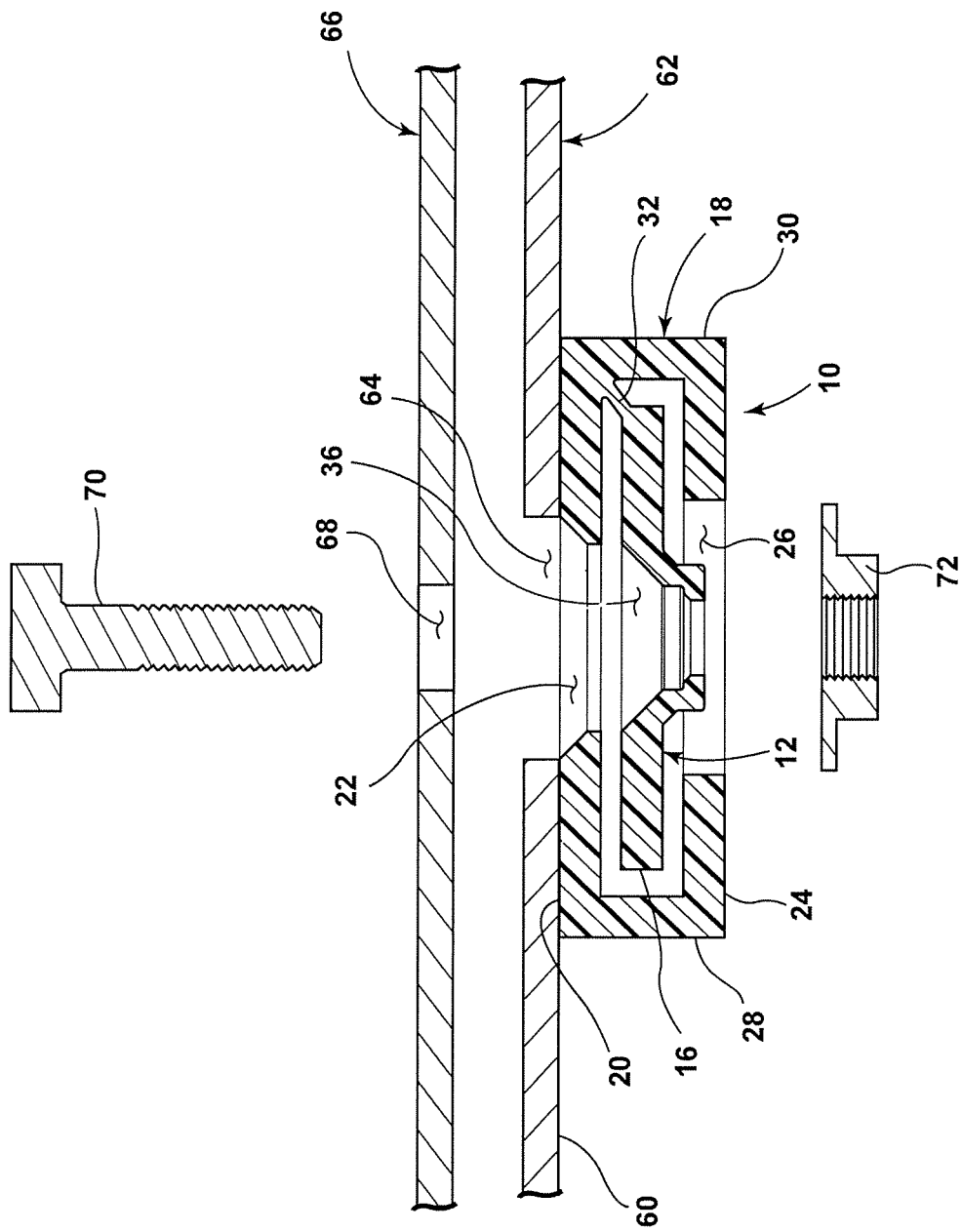
FIG. 7 is a cross-sectional view of the encapsulated retainer, bolt, and vehicular components of FIG. 6.

Referring now to FIG. 7, in operation, the insertion opening 22 of the outer shell 18 is aligned with a clearance hole 64 on the surface 60 of the first component 62. A second substrate or component 66, having a clearance hole 68, is aligned with the first clearance hole 64 and a threaded bolt 70 is inserted therethrough. A threaded nut 72 is installed under the egress opening 26 and the bolt 70 is threaded to the nut 72, as understood by one having ordinary skill in the art. Notably, the nut 72 may include the flange 16, which is generally sized to be received in the egress opening 26. Alternatively, the flange 16 may be larger than the egress opening 26 and cover the egress opening 26.

As described above, both the top wall 20 of the outer shell 18 and the barrel 12 have chamfered edges 34 and 42, respectively, which serve as a lead-in to guide the bolt 70 into position during assembly. Further, the barrel 12 is adapted to float, at least somewhat, within the outer shell 18 to accommodate some degree of misalignment between the bolt 70 and the encapsulated retainer 10. When the bolt 70 is inserted into the barrel 12, an operator torques the bolt 70 in a conventional manner to engage the threaded nut 72. Due to the sheer force transferred from the bolt 70 to the barrel 12, the connector 32 may be broken away from either the flange 16 or the top wall 20. Torquing the bolt 70 and nut 72 urges the components 62, 66 together and mechanically connects the components 62, 66.

Figure 8:
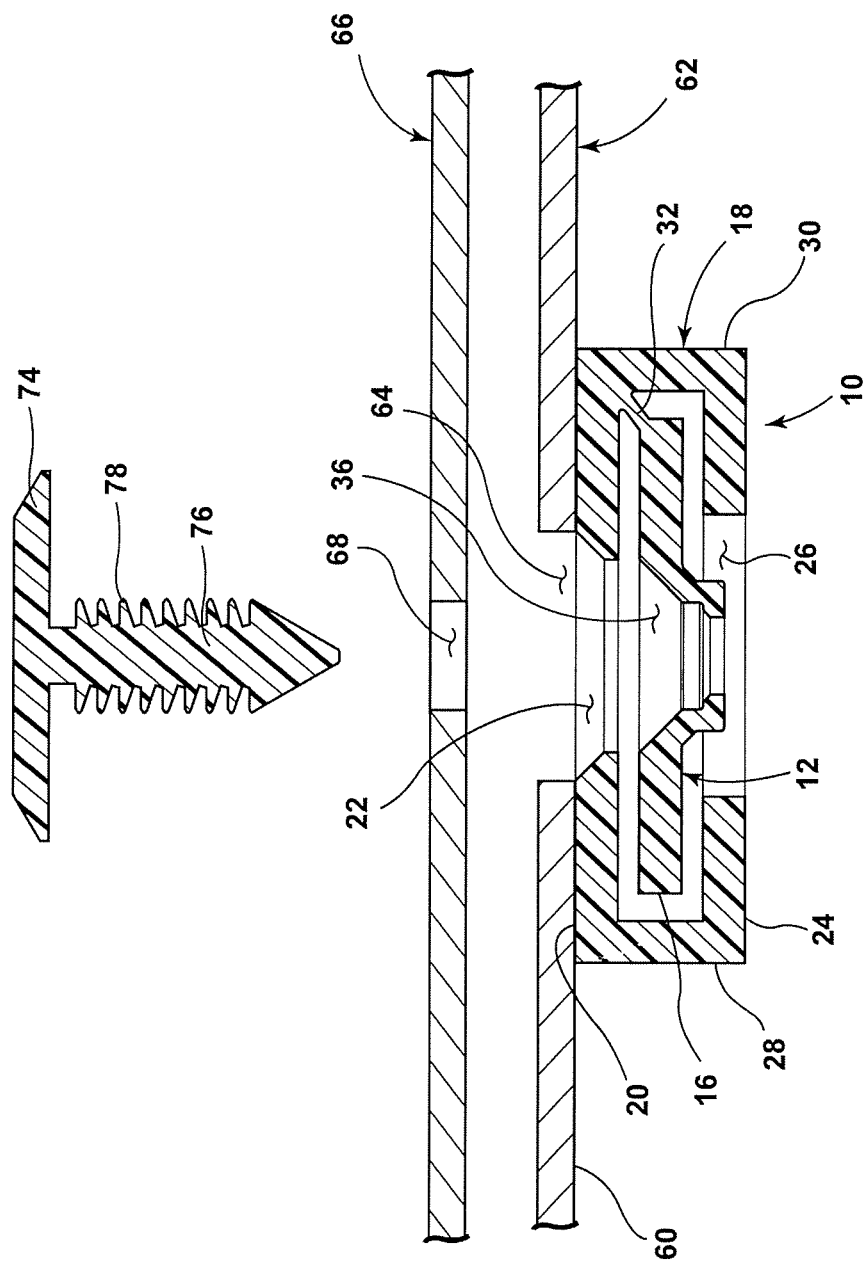
FIG. 8 is a cross-sectional view of the encapsulated retainer, a clip, and vehicular components according to a second embodiment of the present invention.

Referring now to FIG. 8, in a second embodiment of the present invention, the encapsulated retainer 10 is used with a plastic clip 74 having a ribbed shank 76, as is commonly used in the automotive industry. The clip 74 is used in place of the bolt 70 and nut 72. With the two components 62, 66 aligned, as described above, the clip 74 is inserted into the barrel 12 and at least one rib 78 of the ribbed shank 76 is retained by the exterior shoulder 44.

Figure 9:
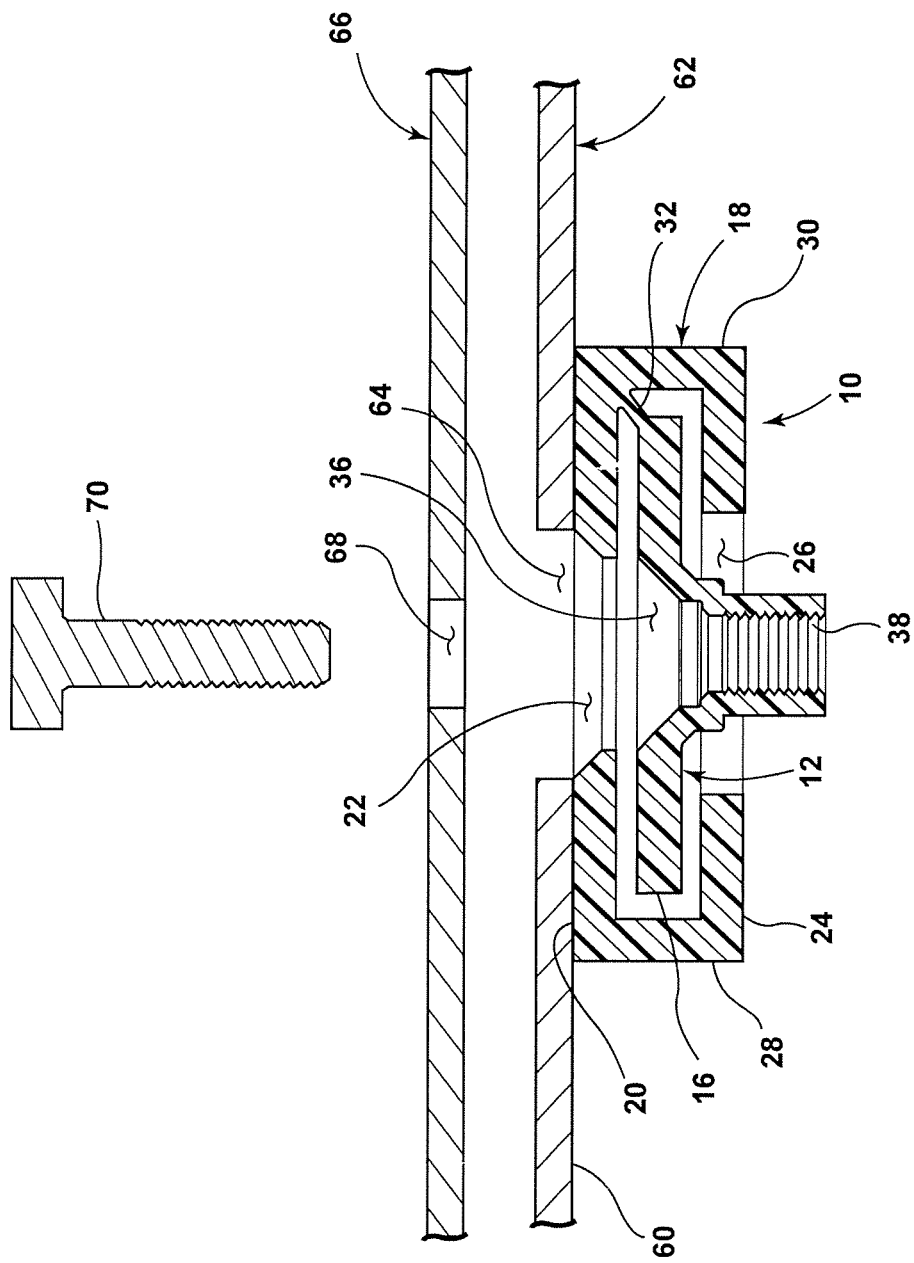
FIG. 9 is a cross-sectional view of the encapsulated retainer, a bolt, and vehicular components according to a third embodiment of the present invention.

Referring now to FIG. 9, in a third embodiment of the present invention, the encapsulated retainer 10 further includes a threaded portion 38. The threaded portion 38 is internally threaded, is integral to the barrel 12, and extends down from the interior shoulder 40. With the threaded portion 38, the nut 72 is no longer required because the bolt 70 is retained by the threaded portion 38.

Figure 10:
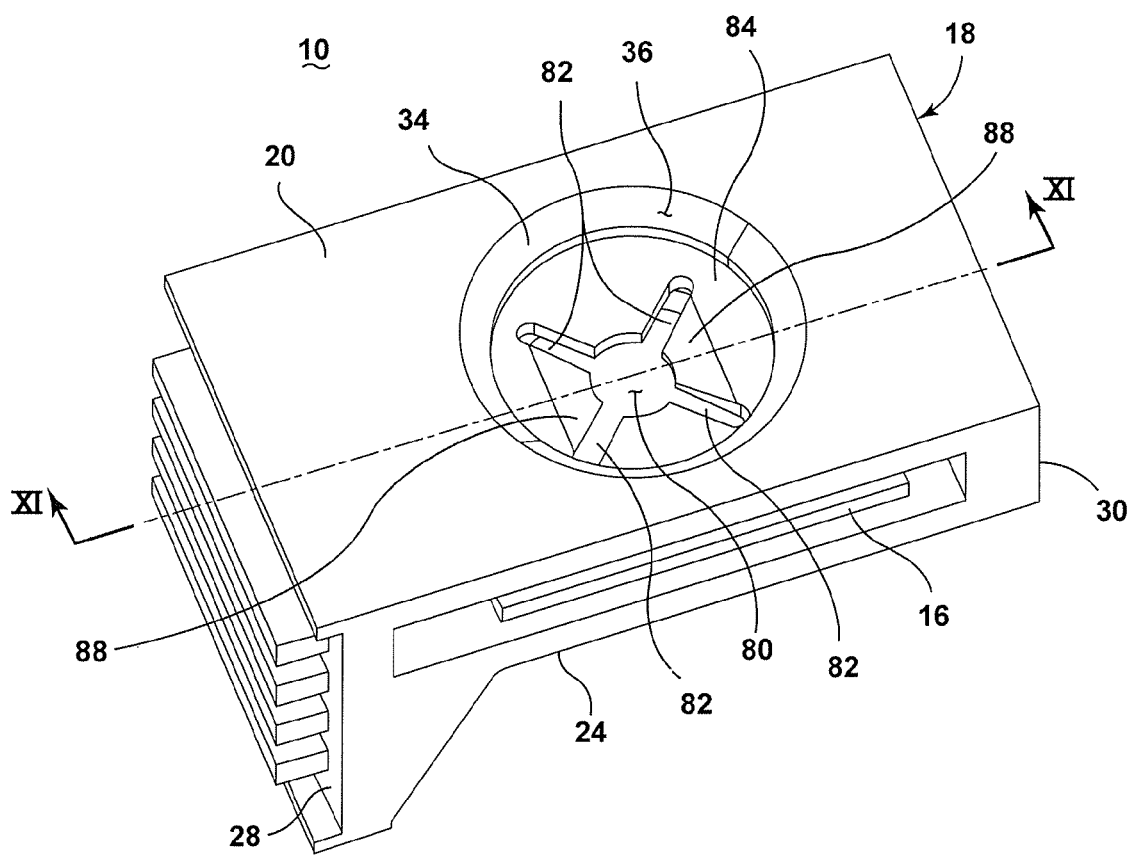
FIG. 10 is a top perspective view of an encapsulated retainer according to a fourth embodiment of the present invention.
Figure 11:
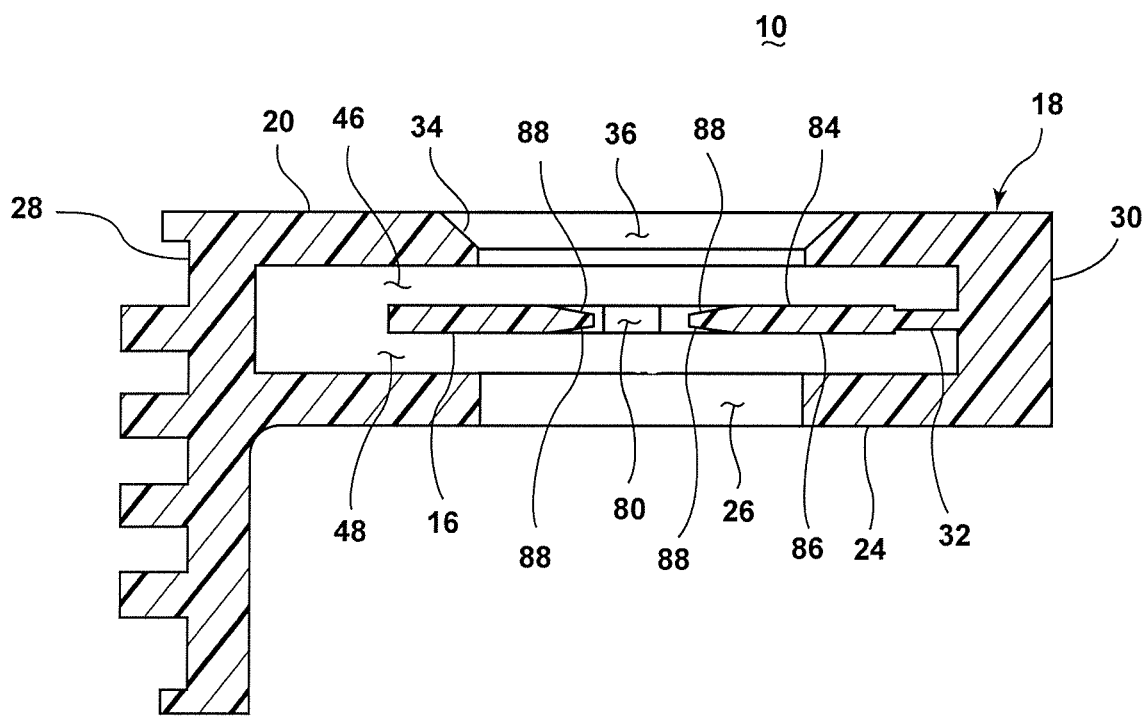
FIG. 11 is a cross-sectional view of the encapsulated retainer taken along line XI-XI of FIG. 10.

Referring now to FIGS. 10-11, in a fourth embodiment of the present invention, the encapsulated retainer 10 includes the outer shell 18 and flange 16, but does not include the barrel 12. The flange 16 includes a center aperture 80 that is co-axial with the barrel-receiving aperture 26 in the bottom wall 24 and the top aperture 36 in the top wall 20. The flange 16 also includes a plurality of slots 82 that extend out from the center aperture 80. In the example illustrated, four slots 82 are shown, however it should be understood that more or fewer slots 82 could be included.

The flange 16 has a top wall 82 and a bottom wall 86, and both the top wall 82 and bottom wall 86 have a chamfered edge 88 proximate the center aperture 80. The chamfered edge 88 is shown extending between two pairs of slots 82, not between all four pairs of slots 82. It has been found that limiting the chamfered edge 88 to between two pairs of slots 82 optimizes the insertion and retention forces required for use with a fastener. As understood by one having ordinary skill in the art, the chamfered edge 88 could extend between all four pairs of slots 82 if desired.

The encapsulated retainer 10 of the present invention provides a simplified means of affixing components together during an assembly operation. The chamfered edges 34, 42 provide a lead-in to add in the alignment of the components and aid in the assembly process. In the second and third embodiments, the encapsulated retainer 10 eliminates the need for a separate nut 72 to be inventoried on the assembly floor. This is especially advantageous given the size of a traditional nut and the tediousness of the handling and assembly thereof. Lastly, it should be noted that the size of the encapsulated retainer 10 can be scaled according to the needs of the assembly application.

The encapsulated retainer 10 is generally constructed from a single-shot injection molding process. Thus, the encapsulated retainer 10 can be made quickly and cost-efficiently without the need for multi-part constructions, thus increasing production speed and reducing costs.

One method of making the encapsulated retainer 10 includes providing a single-shot mold cavity and forming the plastic outer shell 18 having the top wall 20 and the bottom wall 24 attached by the opposing side walls 28, 30. The insertion opening 22 is formed in the top wall 20 and the barrel 12 is formed with fastener-securing void 14 that extends into the egress opening 26. The flange 16 is formed on a periphery of the barrel 12 and connects the barrel 12 to the outer shell 18. The fastener-securing void 14 is formed with the interior shoulder 40 inside the cylindrical receiving barrel 12 and the exterior shoulder 44 is formed on the outer periphery of the cylindrical receiving barrel 12. The chamfered edge 34 is formed in the top wall 20 proximate the insertion opening 22, and the chamfered edge 42 is formed in the barrel 12 proximate the top aperture 36. The first space 46 is formed between the top wall 20 and the flange 16, and the second space 48 is formed between the bottom wall 24 and the flange 16. The first space 46 is substantially equal to the second space 48.

The above descriptions have generally dealt with material. However, it will be understood by one having ordinary skill in the art that the metal used to form the described invention and other components is not limited to material. Other exemplary embodiments of the invention disclosed herein may be formed from other material, or any other suitable material.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the preferred and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An encapsulated retainer comprising:
    a barrel defining a fastener-securing void, the barrel having a flange with a quadrilateral top surface defining a plurality of distinct sides of the flange, the flange fully encompassing a periphery of the barrel, wherein the length of the barrel diameter is less than the length of any of the plurality of sides of the flange;
    an outer shell having a cuboid shape complementary to the shape of the quadrilateral top surface of the flange, the outer shell further having a top wall with a fastener-receiving aperture and a bottom wall with a barrel-receiving aperture, wherein the barrel extends into the barrel-receiving aperture;
    first and second planar sidewalls connecting the top wall with the bottom wall, wherein the sidewalls are linear members positioned at an outer extent of the top and bottom walls, and wherein at least one of the sidewalls prevents rotation of the flange relative to the outer shell; and
    a connector connecting the outer shell with the flange, wherein the flange is spaced a predetermined distance from the outer shell and sidewalls, and wherein the top and bottom walls prevent passage of the flange through the fastener-receiving aperture and the barrel-receiving aperture, and wherein at least one distinct side of the plurality of distinct sides of the flange is co-planar with a portion of an exterior surface of the outer shell.

2. The encapsulated retainer of claim 1, wherein the top wall includes a chamfered edge proximate the fastener-receiving aperture.

3. The encapsulated retainer of claim 1, wherein the barrel is molded with a threaded portion proximate the fastener securing void.

4. The encapsulated retainer of claim 1, wherein the barrel includes a top aperture that communicates with the fastener-securing void and a chamfered edge proximate the top aperture.

5. The encapsulated retainer of claim 1, wherein the barrel includes an interior shoulder proximate the fastener-securing void and disposed below the flange.

6. The encapsulated retainer of claim 1, wherein a first space is defined between an interior side of the top wall and the flange, and a second space is defined between an interior side of the bottom wall and the flange, and wherein the first space is substantially equal to the second space.

7. The encapsulated retainer of claim 1, wherein the connector extends from the top wall of the outer shell and wherein the at least one distinct side is co-planar with portions of each of the top wall, bottom wall, first planar sidewall and second planar sidewall.

8. The encapsulated retainer of claim 1, wherein the barrel includes an exterior shoulder disposed on an outer periphery of the barrel.

9. An encapsulated retainer comprising:
    a plastic outer shell including a top wall and a bottom wall attached by opposing linear sidewalls positioned at an outer extent of the top and bottom walls, the top and bottom walls each including fastener-receiving apertures, respectively; and
    an inner flange having an edge integrally connected to the outer shell and a central aperture that is co-axial with the fastener-receiving apertures, wherein the flange has a quadrilateral top surface and a plurality of sides that are all greater in length than the respective diameters of the fastener-receiving apertures, wherein the central aperture includes a plurality of slots extending outward from the central aperture, and wherein one of the plurality of sides is co-planar with a portion of an exterior surface of the plastic outer shell and wherein a space defined between the inner flange and the top wall is generally equal to a space defined between the innner flange and the bottom wall.

10. The encapsulated retainer of claim 9, wherein the top wall includes a chamfered edge proximate the respective fastener-receiving aperture, and wherein the inner flange includes at least one chamfered portion extending between at least two adjacent slots of the plurality of slots, the chamfered portion being defined within the top surface and a bottom surface of the flange.

11. The encapsulated retainer of claim 9, wherein the plurality of slots of the inner flange define pairs of opposing slots extending from the center.

12. The encapsulated retainer of claim 11, wherein the top aperture communicates with a fastener-securing void in the center aperture, the center aperture including a chamfered edge proximate the top aperture.

13. The encapsulated retainer of claim 9, wherein a first space is defined between the top wall and the inner flange, and a second space is defined between the bottom wall and the inner flange, and wherein the first space is substantially equal to the second space, and wherein the flange has a width substantially equal to widths of the top and bottom walls.

14. The encapsulated retainer of claim 9, wherein a connector extends from one wall of the outer shell.

15. The encapsulated retainer of claim 9, wherein the flange is at least partially co-planar with an exterior surface of the outer shell.

* * * * *